Figure 1:
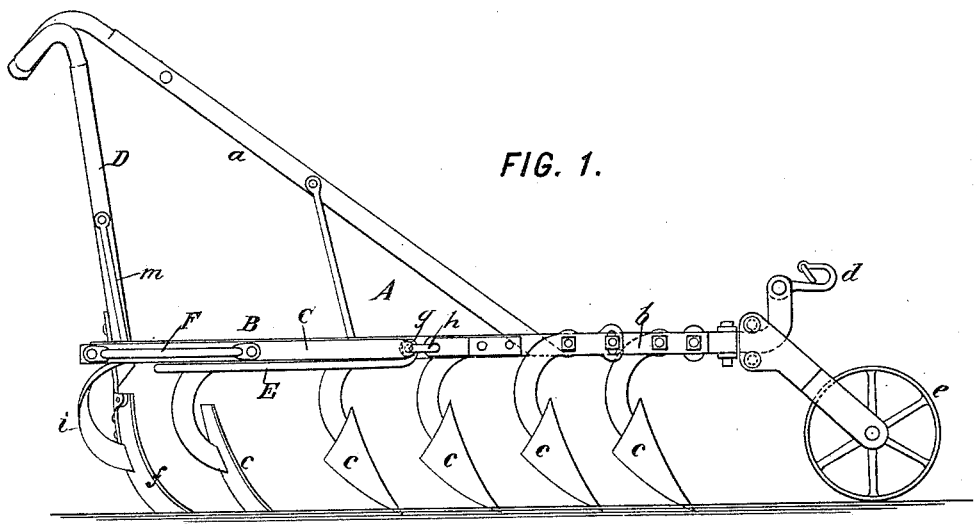

(No Model.) 2 Sheets—Sheet 1.
H. A. FRELING.
CULTIVATOR.

No. 453,632. Patented June 9, 1891.

WITNESSES:
Elvin E. Freling
William Russell

INVENTOR:
Harmon A. Freling,
By his Attorneys,
Arthur G. Fraser & Co.

THE NORRIS PETERS CO., PHOTO-LITHO., WASHINGTON, D. C.

(No Model.) 2 Sheets—Sheet 2.

H. A. FRELING.
CULTIVATOR.

No. 453,632. Patented June 9, 1891.

WITNESSES:
Elvin E. Freling
William Russell

INVENTOR:
Harmon A. Freling
By his Attorneys,
Arthur E. Brown & Co.

UNITED STATES PATENT OFFICE.

HARMON A. FRELING, OF WESTFIELD, NEW YORK.

CULTIVATOR.

SPECIFICATION forming part of Letters Patent No. 453,632, dated June 9, 1891.

Application filed October 27, 1890. Serial No. 369,437. (No model.)

*To all whom it may concern:*

Be it known that I, HARMON A. FRELING, a citizen of the United States, residing at Westfield, in the county of Chautauqua and State of New York, have invented certain new and useful Improvements in Cultivators, of which the following is a specification.

This invention provides an improvement in cultivators, or more exactly an attachment for cultivators, designed to enable them more effectually to remove grass, weeds, &c., from beneath plants, vines, or wires on which vines are trained without injury to the vines or roots.

The invention is applicable for cultivating all small fruits, but is designed more particularly for grape-vines, shrubs, &c.

According to my invention I attach to any ordinary or suitable construction of cultivator a movable frame carrying an auxiliary shovel, to which is connected a guiding-handle, which projects adjacent to one of the handles of the cultivator, so that the operator may manipulate it while guiding the cultivator. This auxiliary frame is pivoted at its front end to the frame of the cultivator by means of a universal joint, so that the frame may be tilted or oscillated and swung toward and from the cultivator-frame. The auxiliary frame is supported and guided by a supporting-frame fixed to and projecting from the said cultivator-frame, so that the auxiliary frame may rest upon it and may slide over it in its swinging movements from and toward the cultivator-frame, or may be thrust so far out that it passes off the supporting-frame to enter more deeply into the earth. This supporting-frame is made of metal rod or bar bent into arc shape at the rear end and extended thence forward diagonally and attached at its front end to the side of the cultivator-frame. This supporting-frame serves to some extent to ward off plants or vines and prevent the too near approach thereof by the cultivator. In addition thereto, a guard is provided for preventing the auxiliary shovel being swung out so far as to injure the roots of the plants or be itself injured by coming into contact with posts or other obstructions, this guard consisting of a brace or metal bar fastened to the outer side of the auxiliary frame. This guard serves to automatically force back the auxiliary shovel-frame in case it is swung out so far as to strike the vines, so that it is caused to swing inward on the supporting-frame far enough to avoid the shovel striking and injuring the roots.

Figure 2:
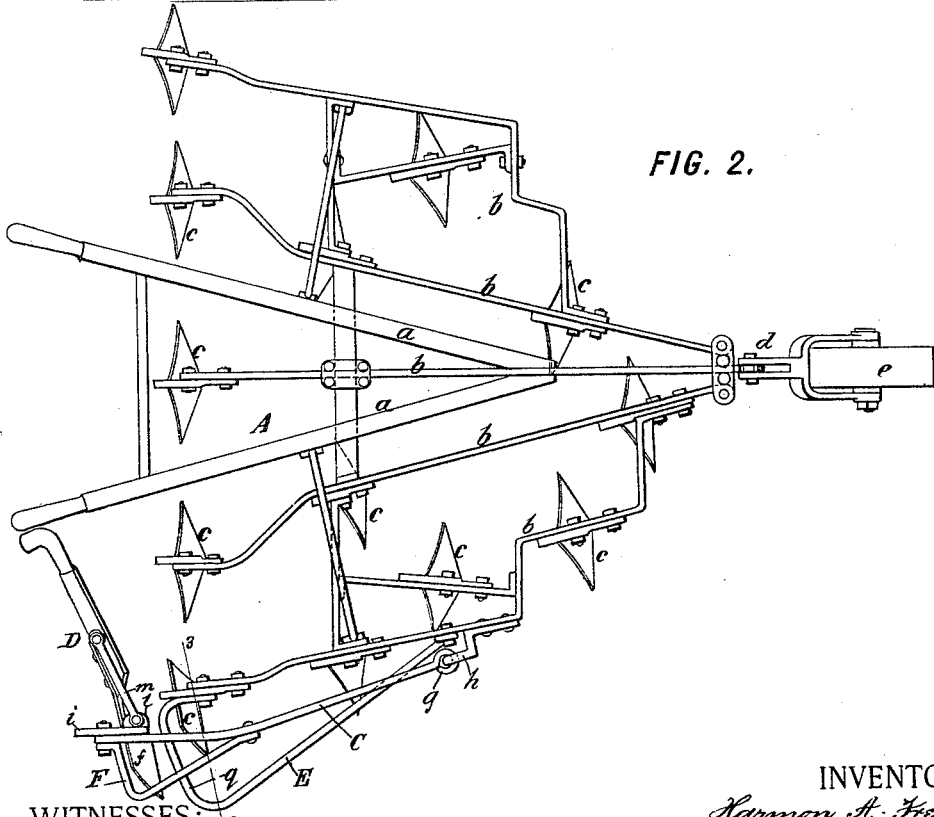
Figure 3:
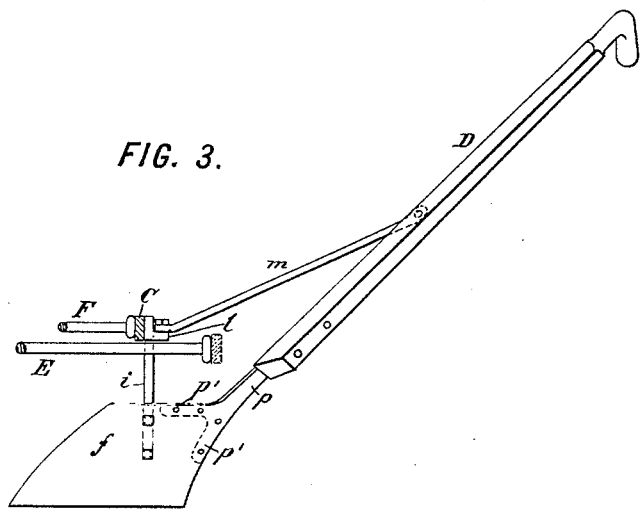
Figure 4:
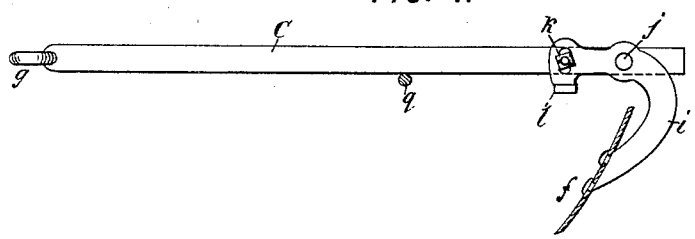
Figure 5:
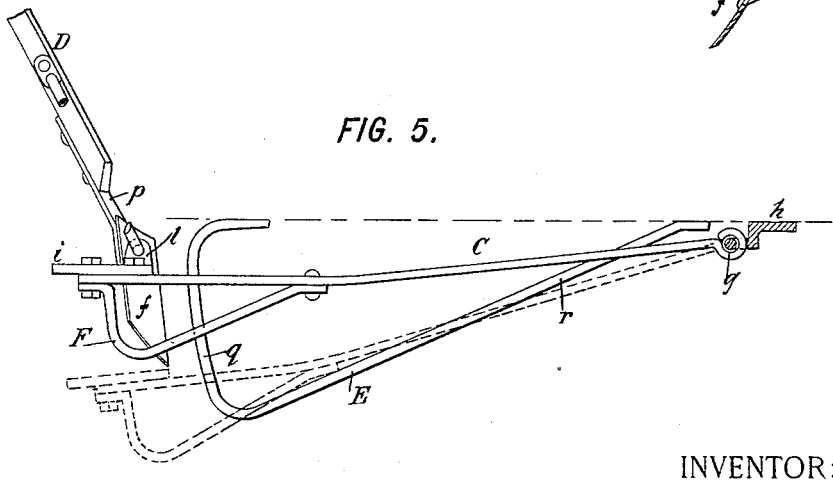

Figure 1 of the accompanying drawings is a side elevation of a cultivator with my invention applied thereto. Fig. 2 is a plan thereof. Fig. 3 is a transverse section of the attachment in the plane of the line 3 3 in Fig. 2 and looking rearwardly. Fig. 4 is a side elevation of the auxiliary frame viewed from the side toward the cultivator and showing the auxiliary shovel and supporting-frame in section. Fig. 5 is a plan of the attachment provided by my invention removed.

Referring to the drawings, let A designate as a whole the cultivator to which the attachment is applied, and B as a whole the attachment provided by my invention. The cultivator A may be of any construction known in the art, carrying one, two, three, or more cultivating-shovels and having its frame constructed in any suitable manner to support and propel the shovels.

The construction of cultivator shown in Figs. 1 and 2 is one well known in the art, and consists in general of handles $a\ a$, longitudinal frames $b\ b$, suitably connected by transverse braces and carrying shovels $c\ c$, and provided at the front end with a draft-hook $d$ and guiding-wheel $e$. The attachment B consists of an auxiliary shovel $f$, supported from the free end of a movable frame C, which is pivoted at its front end $g$ to the cultivator-frame $b$, and a guiding-handle D, connected to the shovel $f$, for moving the same out or in and for tilting it to various angles. The movable frame C is pivoted to the cultivator-frame through the medium of a universal joint, the most simple and convenient construction of which consists of two interengaging eyes, one of which $g$ is formed on the front end of the frame C and the other of which is formed on a piece $h$, fastened to the side of cultivator-frame. This permits of the frame C being swung radially around the joint, as denoted by the full and dotted lines in Fig. 5, and also of its being oscillated to a sufficient extent to tilt the shovel $f$ and cause it to enter the ground at different angles. The shovel $f$ is fastened to a standard $i$ in the manner customary in the mounting of cultivator-shovels, this standard $i$ being pivoted at $j$, Fig. 4, to the frame C and provided with a slotted arm and a clamping-bolt $k$ for adjusting the angle of the shovel, as usual. The slotted arm of brace is provided with an ear $l$, to which is fastened one end of a brace $m$, the other end of which is fastened to the handle D. To the lower end of the handle D is fastened a bar $p$, which at its lower end branches like the letter Y into two arms $p'$ $p'$, Fig. 3, which are fastened to the rear of the shovel $f$ along its upper and inner margins to stiffen it and afford a strong connection between the shovel and the handle. The handle, shovel, and frame C are thus securely connected together and moved as one part. In the adjustment thereof to different angles by means of the clamp $k$ the standard $i$, shovel $f$, handle D, and brace $m$ move together as one part.

The frame C may be kept from dropping down by a supporting-frame E, on which it may rest when swung in to within a certain distance from the cultivator-frame. This frame E consists of a bar of iron fastened at one end to the rear of the cultivator-frame, bent thence backwardly and outwardly preferably in the form of an arc $q$ from the pivotal center of the frame E, and extending thence diagonally forward at $r$, and fastened at its front end to the side of the cultivator-frame. The frame E slopes downwardly from the cultivator-frame to a sufficient extent, as best shown in Fig. 3. The frame C rests on the arc-shaped portion $q$ of the frame E, and may rock thereon as the shovel is tilted, or may be slid thereover as the frame is vibrated outwardly or inwardly. The diagonal portion $r$ constitutes a guard for throwing to one side any plants, vines, &c., that may fall too close to the cultivator and for preventing the cultivator from running too close to posts and stumps.

The movable frame C carries a plant-guard F, consisting of a bar of iron fastened at one end to the rear end of the frame C, extending thence outwardly, and thence extending obliquely forward, and fastened at its other end to the frame. This guard projects sufficiently to prevent the shovel $f$ coming in contact with the roots of vines or with posts, the action of its inclined front side being, on striking the vine or post, to be thrust inwardly thereby, and so to communicate an inward movement to the shovel $f$ and push it up the sloping surface of the frame E. This guard also serves to press aside any vines or wires and prevent their being injured by the cultivator.

I have shown my improved attachment as adapted to the right-hand side of the cultivator; but it may as well be applied to the left-hand side, it being in such case only necessary to reverse its parts in constructing them. The upper end of the handle D may be bent or shaped in any manner, so as to be conveniently grasped by the operator along with one of the handles $a$ of the cultivator.

My improved attachment enables the work of the cultivator to be extended to either side, in order to reach under grape trellises or wires and in and out around posts, roots, &c., thereby accomplishing during the travel of the cultivator additional work which would otherwise require to be done separately by hand.

By the construction of my improved attachment the auxiliary shovel $f$ may be tilted to any desired inclination and moved out or in, as may be necessary to regulate the extent and depth of its penetration.

My invention may be operated in two ways: First, the frame E may be made low enough and the shovel $f$ extending down relatively far enough to enable the shovel to penetrate to the proper depth, while its frame C rests on the frame E. In such case the frame E should extend out far enough to support the shovel-frame C when the shovel is thrust out as far from the cultivator-frame as is desirable to enable it to work in the row between the plants or vines; or, second, the shovel $f$ may be upheld by the frame E only when it is drawn in and is out of action, its frame C being pushed down the frame E when it is swung out to its working position between the vines or shrubs, so that it is no longer upheld by the frame. This is the preferable operation for cultivating rows of grape-vines, trees, &c., the construction being such that on pushing the frame C outwardly it may pass off the frame E, and the shovel $f$ will enter to the desired depth, (according to the angle at which it is set,) and will be held out in the proper position to work in the row or beneath the trellises by its frame C coming against the frame E until its guard F strikes a vine or tree, when it will be forced inwardly and upwardly upon the frame E far enough to clear the vine or root. The operator will then, on passing the latter, push the handle D out far enough to cause the shovel-frame to again slide down the supporting-frame E and the shovel to re-enter the soil. The process of cultivating then consists of an alternation of automatic lifting movements of the shovel-frame and manual displacements thereof to push it down the supporting-frame and cause the shovel to re-enter the soil.

By my invention nearly all hoeing around the plants or vines is avoided, the supplemental shovel doing the work which ordinarily is left to be done by subsequent hand-work with the hoe.

I claim as my invention the following defined novel features, substantially as hereinbefore specified, namely:

1. The combination, with a cultivator having a main frame and its guiding-handles, of a rigid supporting-frame, as E, fixed to and projecting from the side of the main frame, and a movable frame, as C, pivoted at its front end to the cultivator, movable over and supported by said rigid frame, carrying an auxiliary shovel, and provided with a supplemental handle rigidly connected thereto for moving said shovel.

2. The combination, with a cultivator, of a rigid supporting-frame projecting laterally from it and sloping downwardly, an auxiliary shovel, a guiding-handle therefor, and a carrying-frame for said shovel pivoted at its front part to the cultivator-frame, so as to be capable of swinging in or out, upheld by the supporting-frame when swung in, and capable of sliding outwardly and downwardly over said frame to cause its shovel to enter the soil to the requisite depth.

3. The combination, with a cultivator, of an auxiliary shovel, a guiding-handle connected thereto, and a movable frame to which said shovel is fixed, pivoted at its front end to the frame of the cultivator, and a plant-guard carried by said movable frame and projecting from its side to throw off the shovel from plants or posts.

4. The combination, with a cultivator, of a rigid supporting-frame projecting laterally from it and sloping downwardly, an auxiliary shovel, and a carrying-frame for the latter pivoted at its front part to the cultivator-frame, so as to be capable of swinging in or out, upheld by the supporting-frame when swung in, and capable of swinging out beyond said frame, so that its shovel may enter the soil to the requisite depth, and an inclined guard for said shovel-frame adapted on encountering a post or tree to thrust the shovel-frame inward and automatically push it back upon the supporting-frame, so that the shovel is kept from injuring the roots of the plant or tree.

5. The combination, with a cultivator, of an auxiliary shovel $f$, an adjustable brace $i$, by the adjustment of which the shovel may be set at varying angles, a movable frame C, pivoted at its front end to the cultivator-frame, and a handle D, fastened to the shovel $f$.

6. The combination, with a cultivator, of an auxiliary shovel $f$, a movable frame C, to which said shovel is fixed, formed at its front end with an eye $g$, and an eye $h$, fastened to the cultivator-frame and engaging the eye $g$ to form a universal joint for the frame C, whereby the latter may be tilted and moved toward or from the cultivator, and a guiding-handle D, fastened to the shovel and movable frame.

7. The combination, with a cultivator, of a rigid supporting-frame E, fastened to its side, consisting of an arc-shaped rear portion $q$ and an inclined front portion $r$, adapted to form a guard for throwing the cultivator off from posts or vines, and a movable frame C, pivoted at its end to the cultivator-frame, carrying at its rear end an auxiliary shovel $f$, and having a guiding-handle D, said frame being arranged to rest on and slide over the arc-shaped portion $q$ of the supporting-frame.

8. The combination, with a cultivator, of a movable frame pivoted to the side of the cultivator-frame, a standard $i$, pivoted to the rear of this movable frame with a clamp for adjusting it to different angles, an auxiliary shovel $f$, carried by the standard, a bar $p$, projecting from the shovel, a guiding-handle D, fastened to the bar $p$, and a brace $m$, connecting the handle D with the adjustable portion of the standard $i$.

In witness whereof I have hereunto signed my name in the presence of two subscribing witnesses.

HARMON A. FRELING.

Witnesses:
EBIN C. FRELING,
WILLIAM RUSSELL.